United States Patent Office 3,462,425
Patented Aug. 19, 1969

3,462,425
6-HALOGENO-6-DEHYDRO-3-KETO-STEROIDS
Klaus Brückner, Darmstadt, Germany, assignor to E. Merck Aktiengesellschaft, Darmstadt, Germany, a corporation of Germany
No Drawing. Filed Apr. 27, 1959, Ser. No. 808,936
Claims priority, application Germany, Apr. 29, 1958, M 37,504
Int. Cl. C07c 169/30, 169/18, 173/00
U.S. Cl. 260—239.55                          6 Claims This invention relates to steroids; and in particular to novel unsaturated 6-halogeno-3-keto-steroids; and to methods of manufacturing those compounds.

It has been found that a fluorine, chlorine or bromine atom in the 6-position substantially improves the pharmacological activity of the 4- and 6- or the 1-, 4- and 6-positioned unsaturated keto-steroids. The new compounds are well tolerated by the human organism.

Accordingly, it is among the principal objects of this invention to provide 6-halogeno-3-keto-steroids having the general formula:

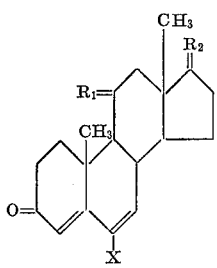

Formula I wherein $R_1$ designates oxygen, (H, H) oder (H, $OR_3$) α or β];
$R_2$ designates oxygen,

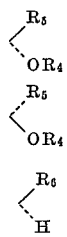

or

$R_3$ designates H, or lower acyl;
$R_4$ designates hydrogen, or acyl;
$R_5$ designates acetyl-, —$CH_3$, —C≡CH or CO·$CH_2OR_4$;
$R_6$ designates acetyl or —$OR_3$; and
X designates a halogen atom having an atomic number not exceeding 35, i.e., fluorine, chlorine or bromine;

and wherein said compounds may also contain a third double bond in the 1,2-position.

A further object of this invention is to provide methods for the preparation of the compounds of the above general Formula I.

The compounds of the present invention may be prepared by the conversion of an unsaturated 3-keto-steroid having the general formula:

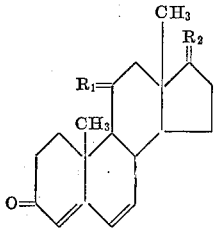

Formula II wherein $R_1$ and $R_2$ have the significance as defined in Formula I (including the corresponding compounds also having a double bond in the 1,2-position), into the corresponding 6-halogeno-7-hydroxy-steroids; and then converting the 6-halogeno-7-hydroxy-steroids by reacting them with a dehydrating agent into doubly or triply unsaturated 6-halogeno-3-keto-steroids of the general Formula I.

The conversion of compounds of the Formula II to the 6-halogeno-7-hydroxy-steroids may be achieved by treatment of the starting material with a per acid followed by treatment with a hydrogen halide.

The compounds of the Formula I may, optionally, be treated with saponifying agents and/or, optionally, converted into physiologically safe 21-esters.

According to the invention, it is not necessary to isolate the 6-halogeno-7-hydroxy-steroid which is obtained as an intermediate product. One can convert the raw solution thereof as formed directly into the final product simply by allowing it to stand at room temperature for about 4 to 24 hours in the presence of an acid. In most cases the acid which is present in the solution as a result of the preparation of the halogen hydrin compound is sufficient to effect splitting off of the water.

The 6-halogeno-7-hydroxy-steroids are prepared from the corresponding 6-dehydrosteroids through the 6α,7α-epoxides. The 6-dehydrosteroids are preferably left standing in chlorinated hydrocarbons, such as chloroform or methylene chloride, for a prolonged period of time with monoperphthalic acid. The subsequent rupture of the epoxide ring with a hydrogen halogenide is effected when hydrogen chloride or hydrogen bromide are used, preferably in solvents, such as the lower carbonic (carboxylic) acids, chloroform or dioxane. The reaction mixture is left standing for several hours, to which preferably small quantities of water may be added. For the rupture of the epoxide ring with hydrogen fluoride, working is preferably effected in solvents, such as chloroform or methylene chloride in the presence of Lewis bases, as for example, tetrahydrofurane, by letting the solution stand for several days with a large excess of hydrogen fluoride.

If the 6-halogeno-7-hydroxy-steroids are isolated and are obtained as intermediate products, practically all the usual agents which split off water are useful for the subsequent dehydration. For example, the treatment with p-toluene sulfonic acid, thionyl chloride or phosphorusoxy chloride in a tertiary base, for example in pyridine, results in good yields of the compounds of the general Formula I above.

In most cases it is sufficient for splitting off of water to add a stronger acid, as for example HBr in glacial acetic acid at room temperature. Good yields can also be obtained with p-toluene sulfonic acid in toluene at boiling temperature.

In the preparation of the 1,4,6-trien-steroids according to this invention, the introduction of the 1,2-positioned double bond may be effected as well after the dehydration of the corresponding 6-halogeno-7α-hydroxy-steroid. A suitable agent for such a dehydrogenation is, for example $SeO_2$.

The preferred starting materials are the following compounds:

6-dehydrocortisone-21-acetate,
6-dehydro-hydrocortisone-triacetate,
6-dehydro-11-epihydrocortisone-11,21-diacetate,
6-dehydro-Reichstein's-substance-S-21-acetate,
6-dehydro-prednisone-21-acetate,
6-dehydro-prednisolone-triacetate,
6-dehydro-11-epi-prednisolone-21-diacetate,
or 1,6-bis-dehydro-Reichstein's-substance-S-21-acetate.

However, in the 6- or the 1- and 6-position unsaturated derivatives of progesterone, 17α-methyl-testosterone, 17α- ethinyl-testosterone or the 17-ether or the ester of the testosterone can also be used as starting material. The 6- or 1- and 6-position unsaturated derivatives of androstenedione are also suitable starting materials for preparing the 6-halogeno-steroids according to the invention.

The compounds of the general Formula II which contain double bonds in the 4- and 6-position and are employed as starting materials, can be obtained, for instance, by dehydrogenating the corresponding 4-en-3-keto-steroids ($\Delta^4$-3-keto-steroids) with chloranil. The triply unsaturated compounds of the Formula II are obtained, for instance, by dehydrogenating the basic 4,6-diene-3-keto-steroids with chemical or microbiological dehydrogenation agents, as for example $SeO_2$ or *Bacillus sphaericus*.

If the compounds of the general Formula I contain ester groups, such groups can be converted in a known manner into the free hydroxyl groups, as for example by the action of acidic or alkaline saponification agents. Preferably, aqueous sodium hydrogen carbonate solution is used with methanol added thereto. The saponification of the triacetate of the 6-halogeno-6-dehydro-prednisolone and the 6-halogeno-6-dehydro-cortisol is preferably effected microbiologically, for example, by the action of the microorganism *Flavobacterium dehydrogenans*.

If the compounds, prepared in accordance with the inventino, contain a 21-hydroxyl group, they can be converted into physiologically unobjectionable esters, for instance, with the following acids or the derivatives thereof suitable for esterification (for example, acid chlorides or anhydrides): acetic acid and the higher homologues thereof; succinic acid and the higher homologues thereof; amino- or alkylamino-carbonic (carboxylic) acids; amino-dicarbonic (dicarboxylic) acids; tetrahydrophthalic acid; cyclopentylpropionic acid; phosphoric acid; sulfuric acid, etc.

The new compounds are pharmacologically well tolerated and are useful as drugs. The 6-halogeno-6-dehydro-derivatives of prednisone and prednisolone and those of cortisone and cortisol excel in anti-inflammatory (antiphlogistic) activity and show good tolerance. The 6-halogeno-6-dehydro-progesterone derivatives are strong progestational agents, whereas the 6-halogeno-6-dehydro-testosterone derivatives are excellent anabolics.

The following are examples in accordance with the invention. Temperatures are given in degrees centigrade. The symbol "g." designates gram.

EXAMPLE 1

(a) 70 g. of 6-dehydrocortisone-21-acetate are dissolved in 7 liters of absolute chlorolorm, mixed with 26.7 g. of monoperphthalic acid and left standing for 60 hours at room temperature. Then the reaction mixture is successively shaken with sodium bicarbonate solution, water, iron (II)-sulfate solution and again with water, dried and concentrated. The $6\alpha,7\alpha$-epoxy-cortisone-21-acetate crystallizes from acetone. F.P. 267–269°.

In a similar manner, sometimes using methylene chloride as solvent and sometimes using only 20% of the solvent given in the example above, the following compounds can be produced:

(b) $6\alpha,7\alpha$-epoxy-cortisol-21-acetate, F.P. 267–270°; $(\alpha)_D=+155°$ (dioxane); $\lambda_{max}$ 240 m$\mu$, E 1% 375.

(c) $6\alpha,7\alpha$-epoxy-prednisone-21-acetate, F.P. 266–270°; $(\alpha)_D=+156°$ (dioxane); $\lambda_{max}$ 240 m$\mu$, E 1% 375.

(d) $6\alpha,7\alpha$-epoxy-17$\alpha$-acetoxyprogesterone, F.P. 253–255°; $\lambda_{max}$ 241 m$\mu$, E 1% 394; $(\alpha)_D=+19°$ (dioxane).

(e) $6\alpha,7\alpha$-epoxy-prednisolone-21-acetate, F.P. 254–260°; $(\alpha)_D=+64.0°$ (dioxane), $\lambda_{max}$ 244 m$\mu$, E 1% 387.

(f) $6\alpha,7\alpha$-epoxy-progesterone, F.P. 178–180°, $\lambda_{max}$ 240 m$\mu$, E 1% 450; $(\alpha)_D=+134°$ (dioxane).

(g) $6\alpha,7\alpha$-epoxy-testosteronpropionate, F.P. 118°, $\lambda_{max}$ 241 m$\mu$, E 1% 427; $(\alpha)_D=+47°$ (dioxane).

(h) $6\alpha,7\alpha$-epoxy, 17$\alpha$-ethinyl-testosterone, F.P. 288–289°, $\lambda_{max}$ 241 m$\mu$, E 1% 466; $(\alpha)_D=-33°$ (dioxane).

(i) $6\alpha,7\alpha$-epoxy-Reichstein's-substance-S-21-acetate, F.P. 235–238°; $\lambda_{max}$ 240 m$\mu$, E 1% 400; $(\alpha)_D=+57.8°$ (dioxane).

(k) $6\alpha,7\alpha$-epoxy-11-epi-cortisol-11,21-diacetate, F.P. 208–210°; $(\alpha)_D=+78°$ (dioxane); $\lambda_{max}$ 240 m$\mu$, E 1% 325.

(l) $6\alpha,7\alpha$-epoxy-17$\alpha$-methyl-testosterone, F.P. 197–199°; $\lambda_{max}$ 240 m$\mu$, E 1% 454; $(\alpha)_D=+28°$ (dioxane).

(m) $6\alpha,7\alpha$-epoxy-11-epi-cortisol-11-tosylate-21-acetate.

(n) $6\alpha,7\alpha$-epoxy-cortisol-triacetate.

(o) $6\alpha,7\alpha$-epoxy-prednisolone-triacetate.

The compounds named under (m) to (o) above were used as raw products for the following reactions.

EXAMPLE 2

(a) To a solution of 10 g. of $6\alpha,7\alpha$-epoxy-cortisone-21-acetate in 260 cc. of absolute chloroform cooled to $-60°$ are added 100 cc. of a solution of 35 g. of $H_2F_2$ in tetrahydrofuran/chloroform (2:1) also cooled to $-60°$ C.; and the mixture is left standing for 65 hours at room temperature. Then the reaction mixture is poured into a sodium bicarbonate solution (saturated), shaken up with acetic ester (ethylacetate) and worked up as usual. The crystalline raw product is filtered with acetic ester (ethyl acetate) over silica gel. The $6\beta$-fluoro-7$\alpha$-hydroxy-cortisone-21-acetate has a melting point of 253–261°.

Analogously to this example, the following compounds can be prepared:

(b) $6\beta$-fluoro-7$\alpha$-hydroxy-prednisone-21-acetate, F.P. 285–288°.

(c) $6\beta$-fluoro-7$\alpha$-hydroxy-progesterone, F.P. 219–222°. $\lambda_{max}$ 231 m$\mu$, E 1% 340; $(\alpha)_D=+56°$ (dioxane).

(d) $6\beta$-fluoro-7$\alpha$-hydroxy-17$\alpha$-acetoxy-progesterone, F.P. 228–230°, $\lambda_{max}$ 232 m$\mu$, E 1% 306; $(\alpha)_D=-28.9°$ (dioxane).

(e) $6\beta$-fluoro-7$\alpha$-hydroxy-testosterone-17-propionate; F.P. 169–171°, $\lambda_{max}$ 232 m$\mu$, E 1% 327; $(\alpha)_D=-11°$ (dioxane).

(f) $6\beta$-fluoro-7$\alpha$-hydroxy-17$\alpha$-ethinyl-testosterone, $\lambda_{max}$ 233 m$\mu$, E 1% 349; F.P. 234–236°; $(\alpha)_D=-70.6°$ (dioxane).

(g) $6\beta$-fluoro-7$\alpha$-hydroxy-Reichstein's-substance-S-21-acetate, F.P. 248–249°, $\lambda_{max}$ 232 m$\mu$, E 1% 297; $(\alpha)_D=+40°$ (dioxane).

(h) $6\beta$-fluoro-7$\alpha$-hydroxy-11-epi-cortisol-11,21-diacetate.

(i) $6\beta$-fluoro-7$\alpha$-hydroxy-11-epi-cortisol-11-tosylate-21-acetate.

(k) $6\beta$-fluoro-7$\alpha$-hydroxy-cortisol-11$\beta$,17$\alpha$,21-triacetate.

(l) $6\beta$-fluoro-7$\alpha$-hydroxy-prednisolone-11$\beta$,17$\alpha$,21-triacetate.

The compounds named under (h) to (l) above were used as raw products for the following reactions.

EXAMPLE 3

(a) 1.9 g. of $6\beta$-fluoro-7$\alpha$-hydroxy-cortisone-21-acetate are dissolved in 25 cc. of acetic acid and left standing together with 5 g. of hydrogen bromide/glacial acetic acid for 1 hour at room temperature. Then the reaction mixture is poured into water, the crystalline product is sucked off, washed and recrystallized from acetone. The pure 6-fluoro-6-dehydro-cortisone-21-acetate melts at 230–232° C., E 1% at 280 m$\mu$ 537, $(\alpha)_D=+195°$ (dioxane).

1 g. of 6-fluoro-6-dehydro-cortisone-21-acetate is dissolved in 70 cc. of methanol and boiled under reflux with 0.2 g. of sodium hydrogen carbonate and 2.15 cc. of water for 10 minutes and under nitrogen. The reaction mixture is poured into water and subsequently exhaustively extracted with chloroform. After evaporation concentration, the 6-fluoro-6-dehydrocortisone crystallizes out. F.P. 215–217°. $\lambda_{max}$ 280 m$\mu$, E 1% 660; $(\alpha)_D=+186.6°$ (dioxane).

(b) 1.4 g. of $6\beta$-fluoro-7$\alpha$-hydroxy-progesterone are heated together with 700 cc. of p-toluene-sulfonic acid in 70 cc. of absolute toluene for 60 minutes while being refluxed. Then the reaction mixture is diluted with ether (diethylether), shaken out with a sodium bicarbonate solution, dried and concentrated. The 6-fluoro-6-dehydro-progesterone crystallizes out from acetate with a melting point of 208–209°, $\lambda_{max}$ 283 m$\mu$, E 1% 642.

(c) Analogously to Example 8(b), the 6-fluoro-6-dehydro-17α-acetoxy-progesterone can be obtained. F.P. 235–236°, $\lambda_{max}$ 283 m$\mu$, E 1% 671; $(\alpha)_D = -65.7°$ (dioxane).

Analogously to Example 8(a), the following compounds can be obtained which can be saponified by treatment with sodium hydrogen carbonate:

(d) 6-fluoro - 6 - dehydro-testosterone-propionate, F.P. 124–125, $\lambda_{max}$ 282 m$\mu$; E 1% 672; $(\alpha)_D = -42.6°$ (dioxane).

(e) 6-fluoro-6-dehydro-prednisone - 21 - acetate, F.P. 239–241°, $(\alpha)_D = +156°$ (dioxane), $\lambda_{max}$ 224, 256, 294 m$\mu$, E1% 262, 288, 278.

6-fluoro-6-dehydro-prednisone, F.P. 214–216, $\lambda_{max}$ 224, 255, 293 m$\mu$, E 1% 273, 296, 285; $(\alpha)_D = +122.6°$ (dioxane).

(f) 6-fluoro-6-dehydro-17α-ethinyl-testosterone, F.P. 242–245°, $\lambda_{max}$ 283 m$\mu$, E 1% 475.

(g) 6-fluoro - 6 - dehydro-Reichstein's-substance-S-21-acetate, F.P. 197–200°, $\lambda_{max}$ 283 m$\mu$, E 1% 536; $(\alpha)_D = +106°$ (dioxane).

6-fluoro-6-dehydro-Reichstein's-substance-S, F.P. 202–204°, $(\alpha)_D = +28.1°$, $\lambda_{max}$ 283 m$\mu$, E 1% 663.

(h) 6-fluoro-6-dehydro - 11 - epi-cortisol - 11,21 - diacetate, F.P. 240–243°, $\lambda_{max}$ 283 m$\mu$, E 1% 440.

6-fluoro-6-dehydro-11-epi-cortisol F.P. 222–224°, $\lambda_{max}$ 284 m$\mu$, E 1% 644; $(\alpha)_D = -8°$ (dioxane).

(i) 6-fluoro-6-dehydro-11-epi-cortisol-11-tosylate - 21-acetate, F.P. 163–166°, $\lambda_{max}$ 226, 281 m$\mu$, E 1% 284, 401.

(k) 6-fluoro-6-dehydro-cortisol-triacetate, (used as raw product for the following reaction).

Microbiological saponification: A sterilized nutrient solution consisting of 80 g. of glucose, 50 g. of yeast extract, 30 g. of ammonium chloride plus water to make a total of 10 liters and buffered to a pH of 7.0 with 1/30 molar phosphate buffer solution according to Sorensen, is inoculated with 200 ml. of a shaking culture of *Flavobacterium dehydrogenans*. While being stirred and aerated, the culture is left to grow at 28° C. for 12 hours. Then a concentrated solution of 12 g. of 6-fluoro-6-dehydro-cortisol-triacetate in dimethylformamide is added and stirred for a further 12 hours at 28° while being aerated. The fermentation solution is extracted 3 times, each time with 5 liters of chloroform. The extract is dried and concentrated. The 6-fluoro-6-dehydro-cortisol crystallizes out from the residue after filtration over silica gel.

(1) 6 - fluoro - 6 - dehydro-prednisolone-triacetate. The saponification to 6-fluoro-6-dehydro-prednisolone is effected analogously to Example 3(k).

From the 21-hydroxysteroids the following physiologically safe 21-esters were prepared: 6-fluoro-6-dehydro-cortisone-21-diethylamino-acetate-hydrochloride, 6 - fluoro-6-dehydro-cortisone-21-hemisuccinate, 6 - fluoro-6-dehydro-cortisol-21-hemisuccinate, 6 - fluoro-6-dehydro-prednison-21-diethyl-amino-acetate-hydrochloride, 6 - fluoro-6-dehydro-prednisolone-21-hemisuccinate, 6-fluoro - 6 - dehydro-prednisolone-diethyl-amino-acetate-hydrochloride.

EXAMPLE 4

5 g. of 6-fluoro-6-dehydro - cortisone - 21 - acetate are boiled under reflux for 48 hours with 250 cc. of tertiary butanol, 3 g. of selenium dioxide and 2.5 cc. of acetic acid. The precipitated selenium is sucked off and the solution is concentrated by evaporation. The 6-fluoro-6-dehydro-prednisone-21-acetate is obtained in several crystalline fractions. Upon filtration over silica gel the pure product melts at 239–241°. In an analogous manner the 6-fluoro-6-dehydro-cortisol-triacetate can be converted to 6-fluoro-6-dehydro-prednisolone-triacetate.

In this specification, the name cortisol is used for 4-pregnen-3,20-dion-11,17α,21-triol (hydrocortisone).

It will be understood that the foregoing description of the invention and the examples set forth are merely illustrative of the principles thereof. Accordingly the appended claims are to be construed as defining the invention within the full spirit and scope thereof.

I claim:
1. 6-fluoro-6-dehydro-progesterone.
2. 6-fluoro-6-dehydro-testosteronpropionate.
3. 6-chloro-6-dehydro-testosterone-propionate.
4. 6α,7α-epoxy-17α-acetoxyprogesterone.
5. 6β-fluoro-7α-hydroxy-17α-acetoxyprogesterone.
6. 6α,7α-epoxy-Reichstein's-substance-S-21-acetate.

References Cited

UNITED STATES PATENTS 2,738,348   3/1956   Colton _____ 260—239.55

OTHER REFERENCES

'Farmaco Ed. Sci.," vol. 13 (1958), pages 52–63, article by Camerino et al., Chem. Abstracts, vol. 52, paragraphs 13,768(f).

ELBERT L. ROBERTS, Primary Examiner

U.S. Cl. X.R.

195—51; 260—397.3, 397.4, 999